Aug. 11, 1953  R. E. HALL  2,648,801
AUTOMATIC LIGHTING CIRCUIT
Filed Jan. 2, 1952
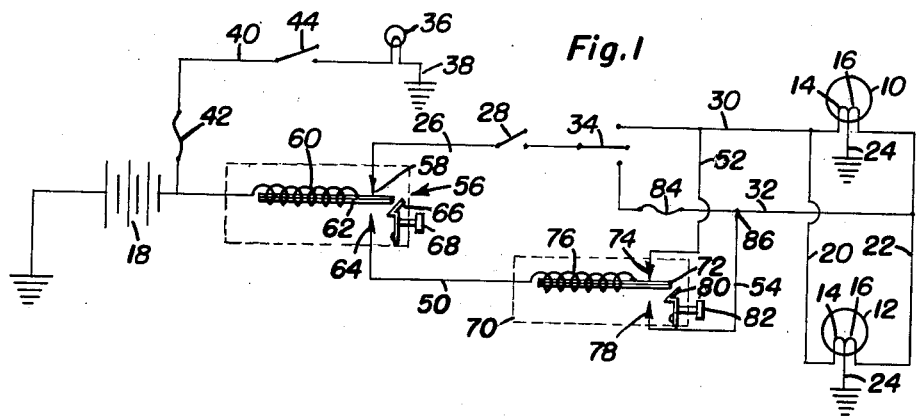
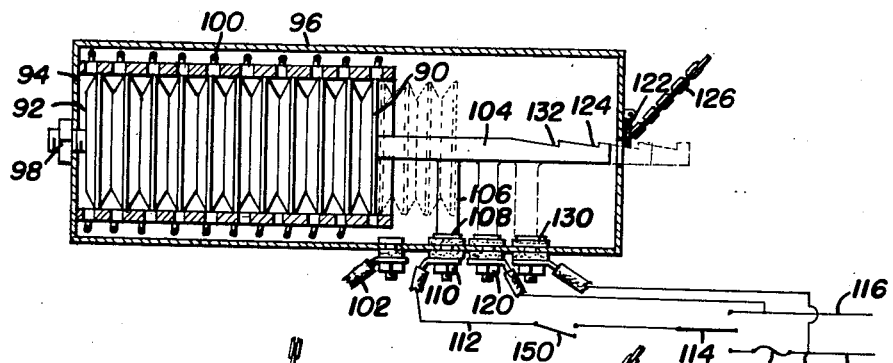
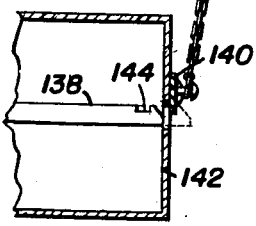
Robert E. Hall
INVENTOR.

Patented Aug. 11, 1953

2,648,801

UNITED STATES PATENT OFFICE 2,648,801

AUTOMATIC LIGHTING CIRCUIT

Robert E. Hall, Larkinsville, Ala.

Application January 2, 1952, Serial No. 264,467

8 Claims. (Cl. 315—83)

This invention relates to an automatic lighting circuit and particularly to a circuit for automotive vehicles having thermostatic means for shunting out the main switch and selector switch of the lighting circuit so that lights may be maintained by an auxiliary circuit connected in shunt around the main switch and selector switch.

In the operation of automotive vehicles it is customary to provide automotive head lights having a plurality of beams generated by a plurality of beam generators. Energy to these beam generators is supplied from a source of energy such as a battery controlled by means of a main switch and a selector switch for connecting one or the other of the beam generators in circuit. Headlamp failures frequently occur because of shorts in the lighting circuit that is connections between the lighting circuit and the frame of the vehicle. While the shorts may occur at any place in the lighting circuit in the event of damage thereto it occurs that most of these shorts occur in the switch means such as the main switch or the selector switch. Because of the drain on the current source occurring when a short is established it is necessary to provide fuse means or other protective means to disconnect the circuit in the event of a short. This leaves the vehicle without lights and establishes an extremely dangerous condition if it is necessary to continue the operation of the vehicle.

The present invention provides an auxiliary circuit connected in shunt in the main and selective switches so that in the event of short circuit anywhere in the lighting circuit or at least in the main lighting circuit the switch will operate to disconnect the main circuit and connect in the auxiliary circuit which in most cases will remove the short and allow the headlamps to continue operation. It is also desirable to provide an auxiliary selector switch also automatically operated in response to over current to select the beam generators so that if that one of the circuits to the beam generator is grounded or shorted the other beam generator may be energized without interference. In order to provide assurance that a ground in the switching apparatus will not short out both the beam generators a fuse is arranged in one of the circuits to the beam generator between the auxiliary selector switch and the main selector switch so that a ground in the main or main selector switch will blow the fuse and allow the auxiliary circuit to be properly connected to the beam generator.

An apparatus according to the invention houses thermostatic switches in the main circuit and a thermostatic auxiliary selector switch which are energized by over current in the main circuit to disconnect the main circuit and connect in the auxiliary circuit and having latching means which are manually opened to release the thermostatic switch after the main circuit has been repaired. Likewise the auxiliary thermostatic selector switch is provided with a latch to latch it in selected position so that the beam generator which can operate without disturbance because of the short will be permanently connected so long as the main circuit remains unrepaired.

An object of this invention is to provide an improved lighting circuit.

It is a further object of this invention to provide an automatic disconnect for a shorted main light circuit.

It is a further object of this invention to provide an automatic by-pass circuit for disturbance in the main circuit.

It is a further object of this invention to provide a thermostatic control for selecting a main or auxiliary circuit.

It is a further object of this invention to provide a thermostatically controlled lighting circuit for maintaining lights as long as there is any possible combination which will produce lights.

Other objects and many of the advantages of this invention will be apparent from the following detail description taken in conjunction with the accompanying drawing in which:

Figure 1 is a schematic diagram of a lighting system according to the invention;

Figure 2 is a view of a modified thermostatic control according to the invention;

Figure 3 is a view of a latching mechanism according to the invention; and

Figure 4 is an elevation of the latching mechanism according to Figure 3.

In the exemplary embodiment of the invention a pair of headlights 10 and 12 are provided with a pair of beam generators 14 and 16 herein illustrated as incandescent filaments, although obviously they could as well be electric discharges excited gases or excited phosphorus or other light emitting devices. Electric energy is supplied to the lamps 10 and 12 by means of a suitable source of electric energy herein indicated as a battery 18. The beam generators 14 and 16 of the lamps 10 and 12 are connected in parallel by means of connectors 20 and 22. As is normal in such circuits one terminal of the source 18 is grounded and the intermediate terminal between the beam generators 14 and 16 is likewise grounded as at 24. Energy is transferred from the source 18 to the lamps 10 and 12 by means of a circuit 26 having a main control switch 28 therein normal high and low beam circuits 30 and 32 a selector switch 34 for selecting either the high or low beam circuit to the line 26. Likewise the tail lamp 36 has one terminal grounded as at 38 receives energy from the source 18 by means of a circuit 40 having a fuse or other over current protective device 42 therein. Energization of the tail light 36 is controlled by means of a switch 44 which is preferably interconnected with the switch 28 to operate simultaneously therewith. Hereinbefore described system is standard on most modern vehicles.

In the operation of such a standard device as hereinbefore described, it would be necessary to provide a plurality of fuses in the branches 30 and 32 and 26 in order to protect the system against short circuits or grounds in the lighting system. In the apparatus according to the invention an auxiliary circuit 50 is arranged in shunt around the main switch 28 and the selector switch 34 and has selector terminals circuits 52 and 54 connected to the high circuit and lower circuit 30 and 32 respectively. A thermostatic switch 56 is normally biased to contact the terminal 58 of the circuit line 26 as a heater coil 60 associated with the bimetallic element 62 connected in series between the source 18 and the line 26 so that any current flowing through the line 26 will flow through the heating coil 60. Upon the occurrence of an over current in the line 26 the heating coil 60 will cause flexure of the bimetallic element 62 causing the switch to close contact 64 and open contact 58 so the energy will flow through the auxiliary circuit 50 instead of the main circuit 26. Latch 66 will receive the bimetallic element and hold it in flexed position so that it must be released by means of a manual element 68 where current can again flow into the circuit 26.

The shunt circuit 50 is provided with a thermostatic element 70 having a bimetallic element 72 which is normally biased to close a contact 74 in the branch 52 connected to the high beam generator 14. A heating element 76 is associated with bimetallic element 72 and is traversed by the current flowing through the auxiliary circuit 50 and in the event of an over current therein will heat the bimetallic element 72 so that it will flex to close the contact 78 of the connection 54 secured to the low beam generator circuit 32. A latch 80 will receive the flexed bimetallic element 72 and hold it in flexed position and to release by means of the manual control 82. In the operation of this form of the device the switch 28 will be closed and the selector switch 34 operated to select either the high or low beam generator 14 or 16. Upon the occurrence of a short in any portion of the lighting circuit occurring after the contact 58 an over current will flow through the heater 60 causing the thermostatic element 62 to flex open the contact 58 and close the contact 64 so that current will then flow through the auxiliary circuit 50 through the contact 74 and line 52 to the line 30 of the high beam generator 14. If there is no short or other disturbance on this connection producing an over current the line will continue to operate in that position and the high beam of the head lights 10 and 12 will be operative. If on the other hand the high beam circuit 26 and 30 contains a ground or short circuit then an over current will flow through the heater 76 causing the bimetallic element 72 to flex and open the contact 74 and close the contact 78 to supply current through the lines 54 and 32 to the low beam generators of the headlamps 10 and 12. In the event there is no disturbance in this line the low beam generators will continue to function. However in the event there is a short some place in the lines 26 and 34 which would be connected to the low beam generators a fuse 84 has been inserted between the selector switch 34 and the connection 86 between the lines 54 and 32 so that current flowing through the auxiliary circuit will burn out the fuse 84 and clear the fault so that the low beam generators would continue to function in spite of the ground on the remaining portion of the line.

Obviously many types of thermostatic elements can be utilized and in Figure 2 is illustrated a further embodiment utilizing an expansive thermostat 90 having the base 92 secured to one end 94 of a housing 96 by means of a suitable fastener such as a screw 98. A heater coil 100 is connected in series with the line 102 connected to a suitable source such as the battery 18.

An expansible thermostat 90 carries a guide element 104 on which is mounted an arm 106 carrying a contact 108 to which is connected the other end of the heater 100, the terminal 108 is normally connected to a terminal 110 to which is connected a lead 112 of the main lighting circuit which goes to the selector switch 114 that selects between the high beam generator line 116 and the low beam generator line 118 substantially in the same manner as the switch 34 selects between the high beam line 30 and the low beam line 32. The line 112 is provided with a main light switch 150.

Upon the occurrence of an over current in the line 112 the heater 100 will operate to cause expansion of the thermostat 90 and cause the contact 108 to move over and make contact with the secondary terminal 120 which will connect the line 102 directly to the high beam generator line 116. In the event there is no further overcurrent the thermostat 90 will be held in extended position by means of the latch 122 which engages a detent 124 on the guide rod 104. In the event the trouble is cleared and it is desired to allow the thermostat 90 to return to its normal position the latch 122 may be lifted by means of the flexible element such as a chain 126 which may be operable in any convenient position such as the dashboard of the vehicle.

In the event the over current should continue after the thermostat has expanded to the contact 120 it will continue to expand until it makes contact with the terminal 130 so that the line 102 will be directly connected to the low beam generator line 118 and if there is no further disturbance the operation will continue as the latch 102 will engage the detent 132 and maintain the thermostat in extended position. A fuse 132 is provided between the connection 134 between the terminal 130 and the low beam generator line 118 so that in the event of a ground in the switch 114 or there behind which is connected to the low beam line 118 the fuse 132 may be burnt out leaving the low beam generator line in operative condition.

A modification according to Figures 3 and 4 shows the guide rod 104 engaged by an oscillatory latch 140 which is pivoted laterally of the end of the casing 142 for engagement with the detent 144 formed in the end of the guide rod 138.

Obviously either one or both of the thermostatic devices 56 or 70 may be replaced by the expansive type thermostat 90.

In the operation of the modification according to Figure 2 the thermostat 90 will normally maintain the contact with the main line 112 which will operate through the switch 114 to energize either the high line generator 116 or the lower generator line 118. However in the event of a short the heating of the thermostat 90 produced by the heater element 100 will cause extension of the thermostat element to cause contact with the terminal 120 and consequent energization of the high beam generator line 116. If the short still persists the continued heating of the thermostat 90 will produce further extension of the thermostat to produce contact with the terminal 130 consequent energization of the low beam generator line 118 and if necessary the burning out of the fuse 132 to produce continuous operation through either the high or low beam generator regardless of the short in a portion of the circuit.

It will thus be seen that this invention provides an automatic system for maintaining lights as long as any of the light generator elements are in operative condition.

For purposes of illustration particular embodiments of this invention have been shown, and described according to the best present understanding thereof. However, it will be apparent to those skilled in the art, that changes and modifications can be made therein without departing from the true spirit of the invention.

Having described the invention, what is claimed as new is:

1. A lighting circuit for a vehicle comprising a power source, a plurality of lamps, each lamp having a plurality of light emitters therein, said emitters being arranged in a plurality of groups, each group including an emitter in each lamp, a circuit connecting said source to said groups of light emitters, a main switch in said circuit, a selector switch selectively connecting one of said groups of light emitters in said circuit, a fuse in series with one of said groups of light emitters, a thermostatic switch in said circuit between said source and said main switch, an auxiliary circuit extending between said thermostatic switch and one of said groups of light emitters, said thermostatic switch being operable in response to excessive current in said first mentioned circuit to open said circuit and connect said auxiliary circuit, and latch means maintaining said thermostatic switch in operated position.

2. A lighting circuit for a vehicle comprising a power source, a plurality of lamps, each lamp having a plurality of light emitters therein, similar emitters being arranged in parallel connected groups, a circuit connecting said source to said light emitters, a main switch in said circuit, a selector switch selectively connecting one group of said light emitters in said circuit, a fuse in series with one group of said light emitters, a thermostatic switch in said circuit between said source and said main switch, an auxiliary circuit extending between said thermostatic switch and one group of said emitters, said thermostatic switch being operable in response to excessive current in said first mentioned circuit to open said circuit and connect said auxiliary circuit to said source, means responsive to further over current to selectively connect a second group of said light emitters in circuit, latch means securing said connection to said auxiliary circuit and said selective connection.

3. In a vehicle lighting system having a source of electrical energy, a pair of dual beam lamps, a pair of beam generators in each of said lamps, a light control circuit connecting said source to said lamps, a main switch controlling said light control circuit, a selector switch selectively energizing the beam generators in said lamps, an automatic light control comprising a thermostatic switch connected between said source and said main switch, a thermostatic element for said thermostatic switch, a heating coil for said thermostatic element, said thermostatic switch normally connecting said source to said main switch, an auxiliary circuit connected in shunt around said main switch and said selector switch, said thermostatic switch operating in response to over current in said light circuit to disconnect said main switch and connect said auxiliary circuit, a latch maintaining said connection to said auxiliary circuit, a flexible element secured to said latch, said flexible element being manually operable to release said latch.

4. In a vehicle lighting system having a source of electrical energy, a pair of dual beam lamps, a pair of beam generators in each of said lamps, a circuit connecting said source to said lamps, a main switch controlling said circuit, a selector switch selectively energizing the beam generators in said lamps, an automatic light control comprising a thermostatic switch connected between said source and said main switch, a thermostatic element for said thermostatic switch, a heating coil for said thermostatic element, said thermostatic switch normally connecting said source to said main switch, an auxiliary circuit connected in shunt around said main switch and said selector switch, said thermostatic switch operating in response to over current in said circuit to disconnect said main switch and connect said auxiliary circuit, said thermostat being further operable by continued over current to change the beam selection of said lamps.

5. In a vehicle lighting system having a source of electrical energy, a pair of dual beam lamps, a pair of beam generators in each of said lamps, a circuit connecting said source to said lamps, a main switch controlling said circuit, a selector switch selectively energizing the beam generators in said lamps, an automatic light control comprising a thermostatic switch connected between said source and said main switch, a thermostatic element for said thermostatic switch, a heating coil for said thermostatic element, said thermostatic switch normally connecting said source to said main switch, an auxiliary circuit connected in shunt around said main switch and said selector switch, said thermostatic switch operating in response to over current in said light circuit to disconnect said main switch and connect said auxiliary circuit, said thermostat being further operable by continued over current to change the beam selection of said lamps, a fuse in series between said last mentioned beam generator and said selector switch, said auxiliary circuit being connected with said fuse in series between the selector switch and said thermostatic switch.

6. In a vehicle lighting system having a source of electrical energy, a pair of dual beam lamps, a pair of beam generators in each of said lamps, a circuit connecting said source to said lamps, a main switch controlling said circuit, a selector switch selectively energizing the beam generators in said lamps, an automatic light control comprising a thermostatic switch connected between said source and said main switch, a thermostatic element for said thermostatic switch, a heating coil for said thermostatic element, said thermostatic switch normally connecting said source to said main switch, an auxiliary circuit connected in shunt around said main switch and said selector switch, said thermostatic switch operating in response to over current in said circuit to disconnect said main switch and connect said auxiliary circuit, a thermostatic selector switch in said auxiliary circuit and fuse means interposed between said selector switch and said thermostatic selector switch.

7. In a vehicle lighting system having a source of electrical energy, a head lamp having a first and second light emitting element therein a circuit for controlling energization of said light emitting elements comprising a main switch, a selector switch operable to selectively energize said light emitting elements, a thermostatic switch interposed in series circuit relation between said source and said main switch, a plurality of contacts in said switch, a first contact connected to said main switch, a second contact connected to said first light emitting element, a third contact connected to said second light emitting element, said thermostatic switch being operative in response to over current to disconnect said first contact from said source and to connect said second contact to said source, said thermostatic switch being further operative on continued over current to disconnect said source from said second contact and to connect said source to said third contact, latch means retaining said thermostatic switch in operated position.

8. In a vehicle lighting system having a source of electrical energy, a head lamp having a first and second emitting element therein a circuit for controlling energization of said light emitting elements comprising a main switch, a selector switch operable to selectively energize said light emitting elements, a thermostatic switch interposed in series circuit relation between said source and said main switch, a plurality of contacts in said switch, a first contact connected to said main switch, a second contact connected to said first light emitting element, a third contact connected to said second light emitting element, said thermostatic switch being operative in response to over current to disconnect said first contact from said source and to connect said second contact to said source, said thermostatic switch being further operative on continued over current to disconnect said source from said second contact and to connect said source to said third contact, latch means retaining said thermostatic switch in operated position, a fuse connected in series with said second light emitting element, said third contact being connected between said fuse and said element.

ROBERT E. HALL.

References Cited in the file of this patent
UNITED STATES PATENTS

| Number | Name | Date |
|---|---|---|
| 2,068,580 | Tomlin | Jan. 19, 1937 |
| 2,100,695 | Lackey | Nov. 30, 1937 |
| 2,223,251 | Hack | Nov. 26, 1940 |
| 2,342,639 | Bradley | Feb. 29, 1944 |
| 2,496,020 | Pepper | Jan. 31, 1950 |